United States Patent
Miller et al.

(10) Patent No.: US 7,229,094 B2
(45) Date of Patent: Jun. 12, 2007

(54) WALKING WATTS AIR BEAM

(75) Inventors: Steven R. Miller, Clarkston, MI (US); Mark P. Reynolds, Birmingham, MI (US); James Eckelberry, Canton, OH (US); Robert P. Carlstedt, Rochester Hills, MI (US); Daniel G. Chien, Franklin, MI (US); Kenneth G. Lang, Davison, MI (US); Martin Peaker, Upton (GB); Nancy L. Saxon, Oakland Township, MI (US); Jos Timmermann, Oak Park, MI (US); Jeff Lloyd, Auburn Hills, MI (US); James Grant, Royal Oak, MI (US); Richard M. Clisch, Canton, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 450 days.

(21) Appl. No.: 10/853,426

(22) Filed: May 25, 2004

(65) Prior Publication Data
US 2005/0263985 A1 Dec. 1, 2005

(51) Int. Cl.
*B60G 5/00* (2006.01)
(52) U.S. Cl. .................. 280/677; 280/124.107
(58) Field of Classification Search ........ 280/676–679, 280/124.106, 124.107
See application file for complete search history.

(56) References Cited

U.S. PATENT DOCUMENTS

| | | | | |
|---|---|---|---|---|
| 1,912,308 A * | 5/1933 | Rayburn | | 280/681 |
| 3,315,979 A * | 4/1967 | Chalmers | | 280/681 |
| 3,451,692 A * | 6/1969 | Kappe | | 280/678 |
| 3,547,461 A * | 12/1970 | Sheridan | | 280/681 |
| 4,136,893 A | 1/1979 | Sweet et al. | | |
| 4,202,564 A | 5/1980 | Strader | | |
| 4,460,196 A * | 7/1984 | Perlini | | 280/676 |
| 4,687,222 A | 8/1987 | Chalmers | | |
| 5,016,905 A * | 5/1991 | Licari | | 280/677 |
| 5,464,245 A | 11/1995 | Vogler | | |
| 5,718,445 A | 2/1998 | VanDenberg | | |
| 5,944,339 A | 8/1999 | McKenzie et al. | | |
| 6,224,074 B1 | 5/2001 | Cadden | | |
| 6,276,710 B1 | 8/2001 | Sutton | | |
| 6,460,872 B2 | 10/2002 | Cadden | | |
| 6,626,454 B1 * | 9/2003 | Power et al. | | 280/683 |
| 6,666,474 B2 * | 12/2003 | Pavuk | | 280/677 |
| 2002/0130474 A1 | 9/2002 | Richardson | | |
| 2002/0163165 A1 | 11/2002 | Adema et al. | | |

* cited by examiner

*Primary Examiner*—Paul N. Dickson
*Assistant Examiner*—Drew J. Brown
(74) *Attorney, Agent, or Firm*—Carlson, Gaskey & Olds

(57) ABSTRACT

A tandem axle suspension assembly includes a pair of walking beams disposed substantially parallel to a vehicle longitudinal axis supporting first and second axles. A link plate is pivotally attached to each of the walking beams and is pivotal about an axis transverse to the longitudinal axis. A first and a second link include pivotal connections between the link plate and a vehicle frame member. Vertical movement of the walking beams causes a corresponding rotation of the link plate to compensate for longitudinal displacement of the pivotal links with the first and second links and minimize longitudinal displacement of the walking beams.

18 Claims, 3 Drawing Sheets

WALKING WATTS AIR BEAM

BACKGROUND OF THE INVENTION

This invention generally relates to a tandem axle suspension assembly, and more specifically to a walking beam tandem axle suspension assembly.

Typically, vehicles such as cargo trailers include a mechanical steel leaf spring for suspending an axle from a vehicle frame. The steel leaf spring suspension requires little maintenance and provides favorable loading dock performance. The favorable dock performance results from a relatively small amount of vertical displacement between loaded and unloaded conditions of the leaf spring suspension. However, the leaf spring suspension may provide relatively harsh ride characteristics during unloaded or lightly loaded conditions.

Another trailer suspension utilizes air springs for each axle. The air springs provide favorable ride characteristics regardless of the load on the trailer. Further, specific ride characteristics can be tailored to a specific load and desired handling characteristics.

Disadvantageously, an air suspension system may be more expensive than a comparable leaf spring suspension. Air spring suspension systems may also not provide optimal loading dock performance due to height variations between loaded and unloaded conditions. In some instances, conventional air spring suspension systems utilize mechanical add on devices such as an adjustable stop inserted between the trailer frame and the suspension to limit movement relative to a loading dock. Other devices include manually operated jacks that support the trailer at a fixed height. Such devices typically require manual operation before, during and after the loading process. As appreciated, these mechanical add on devices increase weight, expense, and maintenance requirements.

Accordingly, it is desirable to develop an air spring suspension system with favorable loading dock performance without sacrificing favorable ride characteristics.

SUMMARY OF INVENTION

The suspension assembly of the present invention includes a link plate pivotally attached to a walking beam. The link plate rotates during vertical movement of the walking beam to minimize lateral displacement of the walking beam.

A pair of axles are attached to a pair of walking beams disposed longitudinally relative to a frame of a vehicle. Vertical displacement of the walking beams causes a corresponding rotation of the link plate due to pivotal connections with an X-link and a torsion link. Rotation of the link plate accommodates longitudinal displacement of the fixed length X-link and torsion link to minimize longitudinal displacement of the walking beams. Vehicle load is transmitted through the axles to a pair of air spring assemblies disposed on each of the walking beams. The walking beams distribute loads between the two axles and between both of the air springs to the frame of the vehicle.

Accordingly, the suspension assembly of this invention provides favorable loading dock performance and favorable ride characteristics without additional add on devices.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
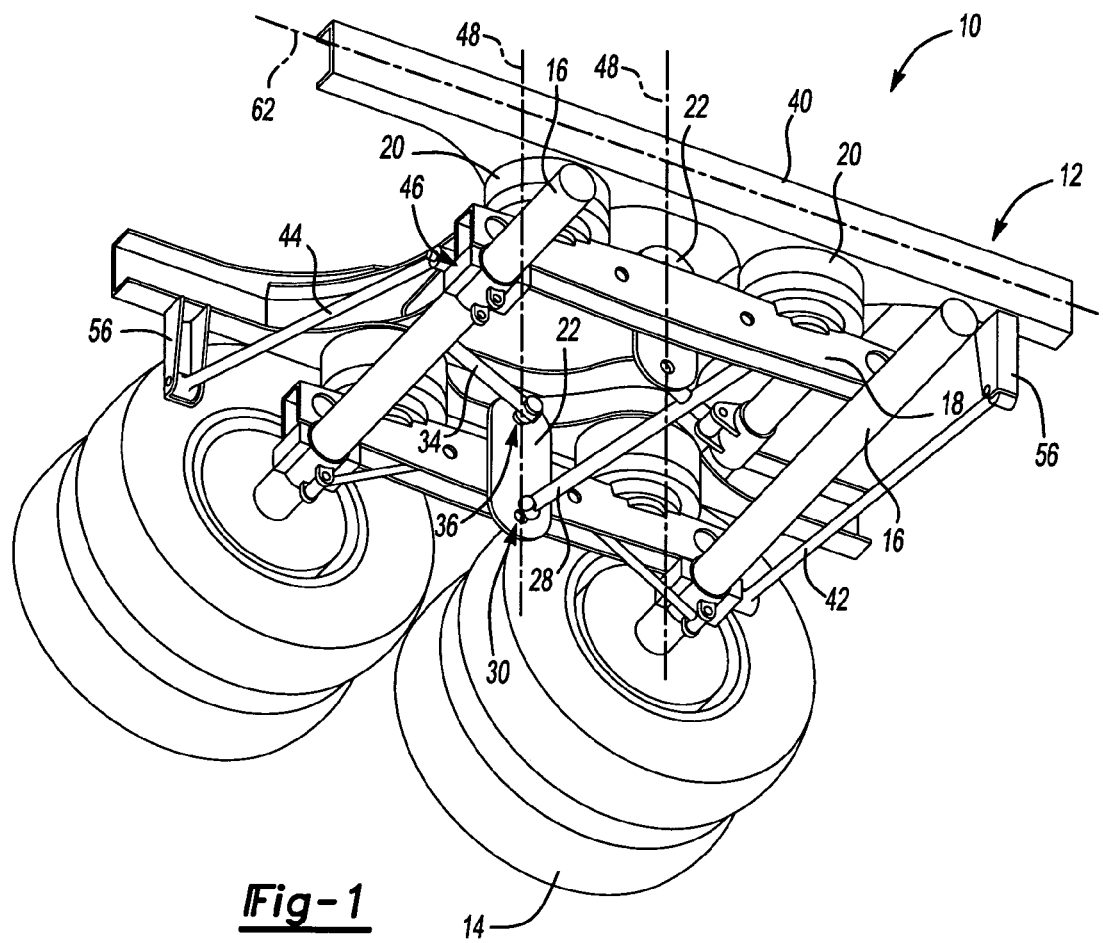
FIG. 1 is a perspective view of a tandem axle suspension assembly according to this invention.
Figure 2:
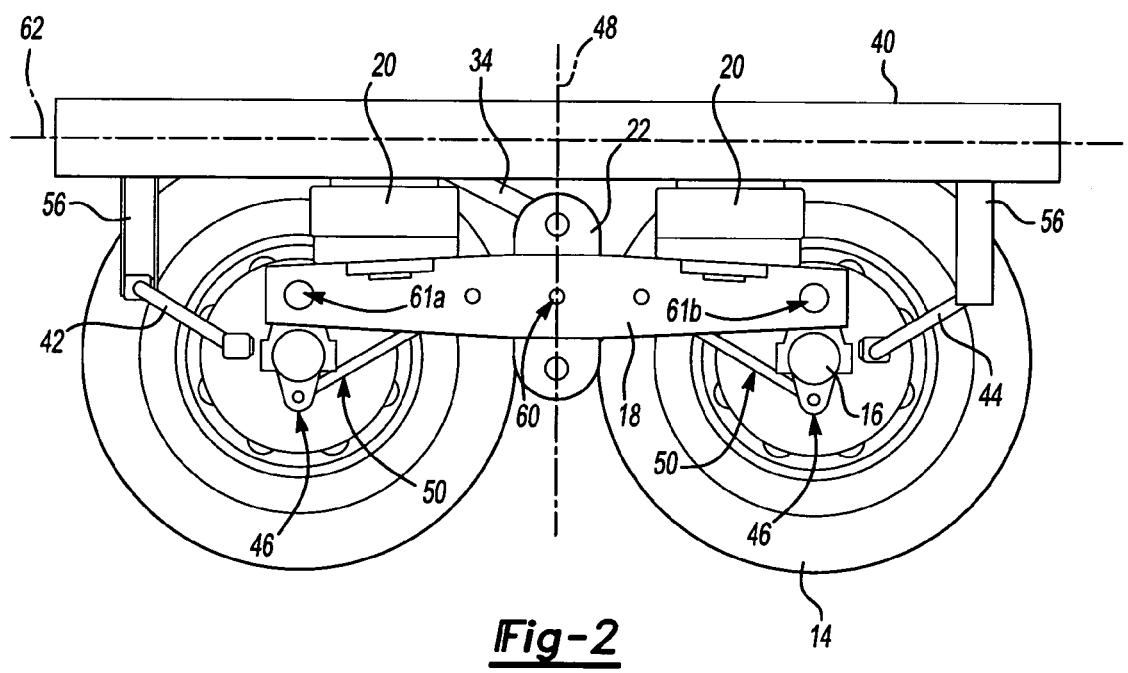
FIG. 2 is a side view of a tandem axle suspension assembly according to this invention.

Referring to FIGS. 1 and 2, a suspension assembly 10 includes a pair of axles 16 pivotally attached to a pair of walking beams 18. The walking beams 18 are disposed parallel to longitudinal axis 62 defined along the length of a vehicle 12. Preferably, the suspension assembly 10 supports axles 14 that are not driven such as are commonly used for cargo trailers, however, a driven axle system may also benefit from the suspension assembly 10 of this invention.

A link plate 22 is rotatably attached to a center segment of each walking beam 18. The link plate 22 rotates relative to the walking beam 18 about an axis 60 that is transverse to the longitudinal axis 62 defined along the length of the vehicle 12. The rotatable attachment between the link plate 22 and the walking beam 18 may be as is known in the art that provides for movement of the link plate 22 relative to the walking beam 18.

An X-link 28 and a torsion link 34 are pivotally attached to opposite segments of the link plate 22. A pair of air spring assemblies 20 are mounted to each of the walking beams 18 to support vertical movement relative to a frame 40. The air spring assemblies 20 can be of any type known to a worker skilled in the art.

The X-link 28 includes a pivotal connection 30 to one segment of the link plate 22. The torsion link 34 includes a pivotal connection 36 to a second segment of the link plate 22. The pivotal connections 30, 36 are disposed on the link plate 22 within a common vertical plane 48 such that vertical movement of the walking beams 18 causes rotation of the link plate 22.

Figure 3A:
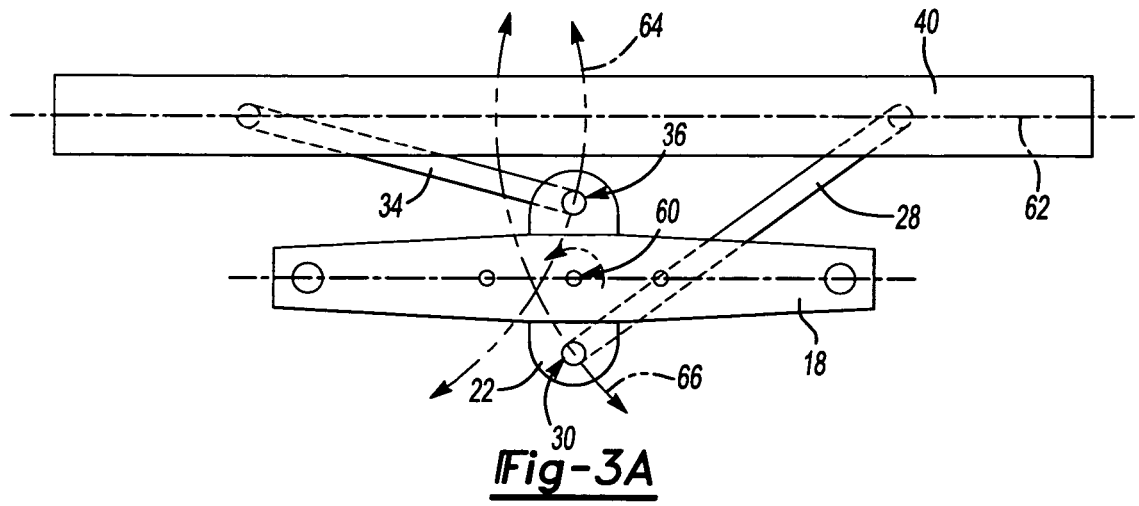
FIG. 3A is a schematic view of a walking beam and link plate in a start position.
Figure 3B:
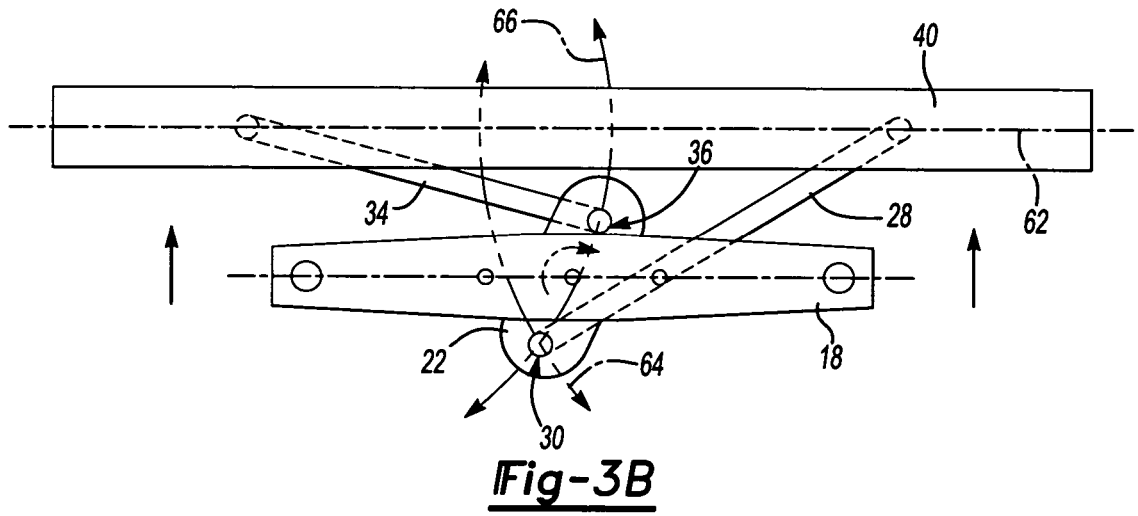
FIG. 3B is a schematic view illustrating rotation of the link plate during displacement of the walking beam.
Figure 3C:
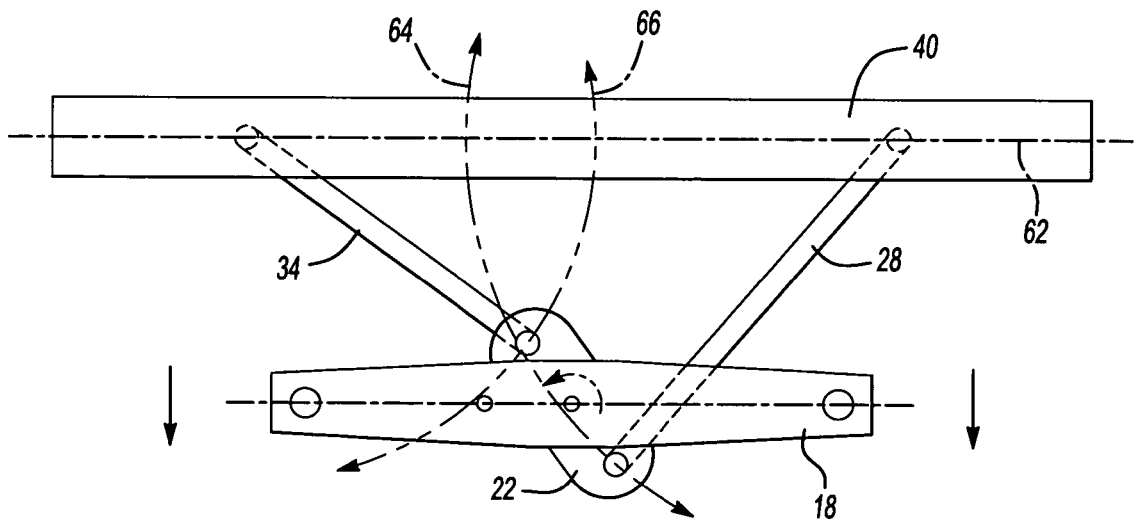
FIG. 3C is another schematic view illustrating rotation of the link plate during displacement of the walking beam.

Referring to FIGS. 3A and 3C because the X-link 28 and torsion link 34 are of a fixed length, vertical movement of the walking beams 18 results in arc paths 64 and 66 of the pivotal connections 30, 36 (schematically illustrated and exaggerated by dashed lines). The arc paths 64, 66 of the pivotal connections 30, 36 includes a longitudinal displacement component. Rotation of the link plate 22 accommodates this longitudinal displacement of the pivotal connections 30, 36 such that minimal longitudinal displacement is transferred to each of the walking beams 18 during vertical movement. Minimizing longitudinal movement of the walking beams 18 maintains a substantially parallel relationship between the each of the walking beams 18 and the frame 40 during vertical displacement.

FIG. 3A illustrates a neutral position of the walking beam 18 relative to the frame 40. In this neutral position, the link plate 22 is disposed in a substantially perpendicular position relative to the walking beam 18. The X-link 28 and the torsion link 34 are both of a fixed length and attached to the link plate 22 at pivotal connections 30, 36. Vertical displacement of the walking beam 18 will cause movement of the pivotal connections along the arc paths 64, 66.

Referring to FIG. 3B, upward vertical displacement causes a clockwise rotation of the link plate to accommodate the arc paths 64, 66 of the pivotal connections 30, 36. The walking beam 18 remains substantially parallel to the frame 40 during vertical displacement because of the compensating rotation of the link plate 22.

Referring to FIG. 3C, downward vertical displacement results in a counterclockwise rotation of the link plate 22. Again, the walking beam 18 remains substantially parallel to the frame 40 and longitudinal axis 62, while rotation of the link plate 22 compensates for any longitudinal displacement of the pivotal connections 30, 36. As appreciated, the rotational displacement of the link plate 22, and arc paths 64, 66 of the pivotal connections 30,36 are greatly exaggerated to illustrate the compensating motion of the link plate 22.

Figure 4:
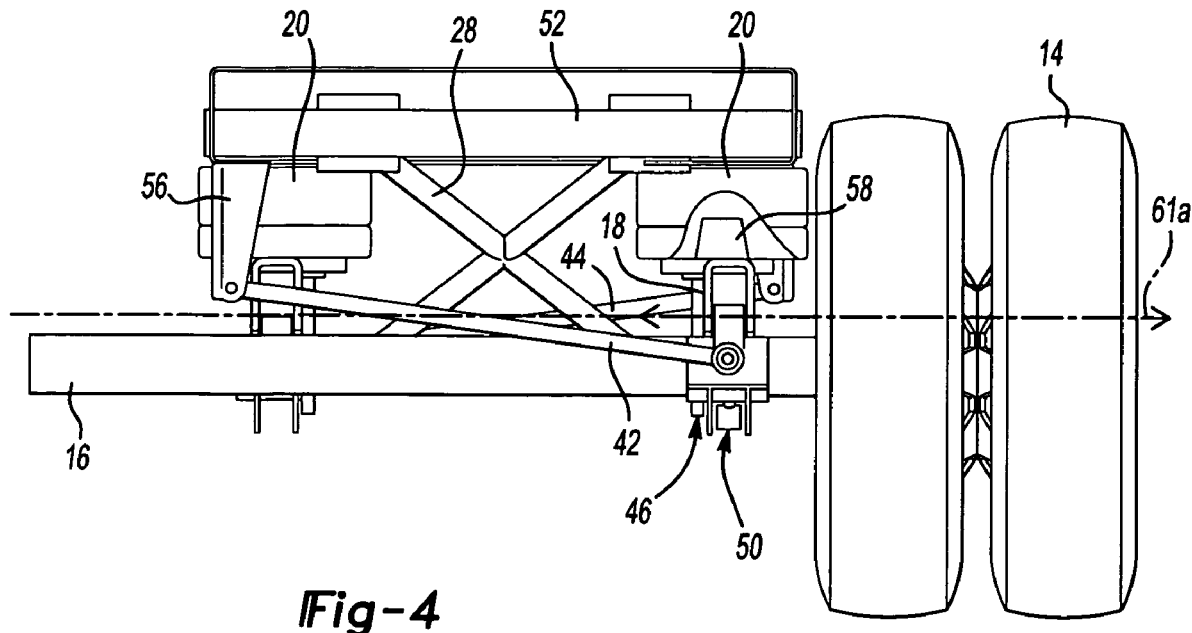
FIG. 4 is a rear view of a portion of a suspension assembly.

Referring to FIG. 4, the rear of the suspension assembly 10 is shown with part of the frame 40 cutaway for clarity. The two axles 16 are pivotally attached to the walking beam 18 by a mount bracket 46. The attachment between the axle 16 and the mount bracket 46 fixes the axles 16 relative to the walking beams 18. Links 50 are connected to constrain movement of the axle 16 and the mount bracket 46 relative to the walking beam 18.

Lateral stability of the walking beams 18 is provided by first and second torque links 42, 44 that are pivotally attached between the mount bracket 46 and at a frame bracket 56. The first and second torque links 42, 44 are mounted transversely from each of the mount brackets 46 and pivot to accommodate vertical movement of each of the walking beams 18. The first and second torque links 42, 44 are mounted in opposing directions relative to one another to constrain lateral movement of each of the walking beams 18.

The walking beam 18 distributes loads between the axles 16 while providing an increased range of movement that in turn improves ride quality. The air spring assemblies 20 provide the desired ride characteristics for any specified load configuration. Preferably, when the vehicle 12 is lightly loaded the damper characteristics are relatively compliant and when the vehicle 12 is fully loaded damper characteristics are relatively more rigid to accommodate the increased load.

Preferably, the air spring assemblies 20 include a bumper 58 to limit overall movement of the walking beam 18 relative to the frame 40. Once air is exhausted from the air spring assemblies 20 the frame 40 rests on the bumpers 58. Resting the frame 40 on the bumpers 58 improves dock performance by providing a substantially fixed height during unloading. The bumpers 58 minimize drop from a ride height with the air spring assemblies 20 inflated to the unload height used while unloading the vehicle 12. The unload height for a specific vehicle is application specific, and a worker skilled in the art with the benefit of this disclosure would understand how to configure the bumper 58 to provide desired unload height.

Figure 5:
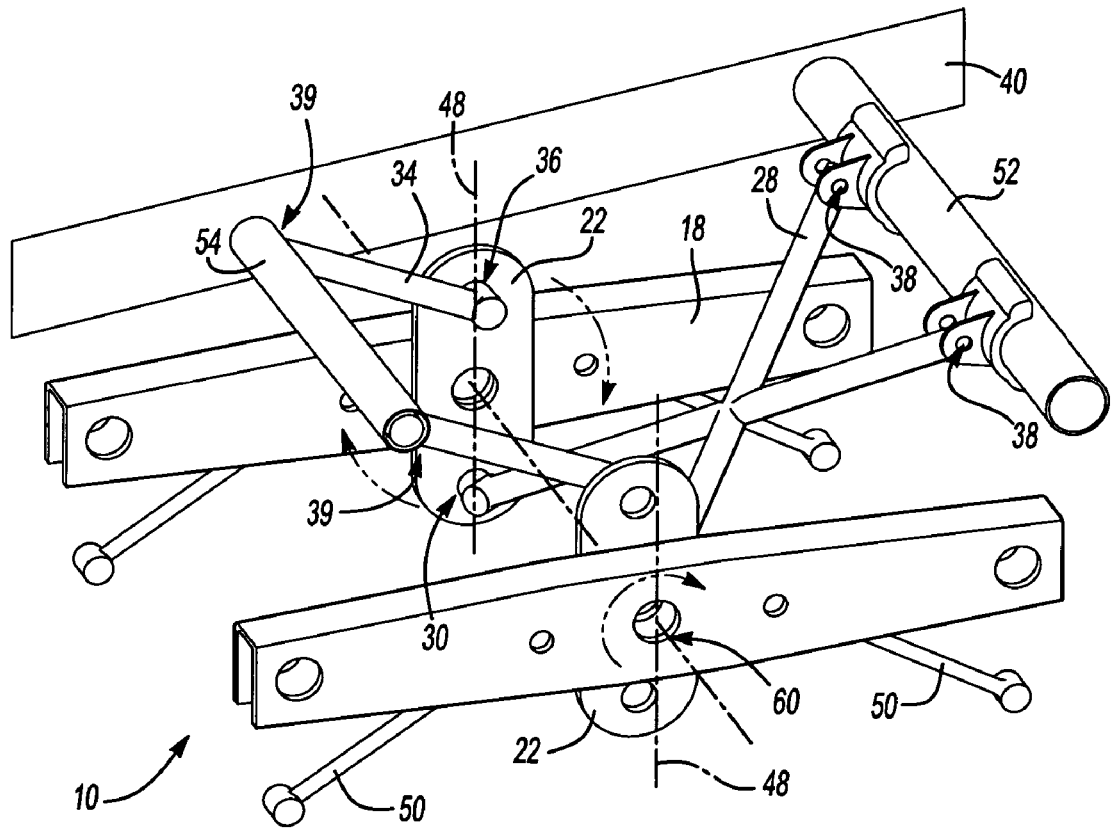
FIG. 5 is a perspective view of the suspension assembly with the axles removed for clarity.

Referring to FIG. 5, the suspension assembly 10 is shown with the axles 16, wheels 14, and air spring assemblies 20 removed. This view illustrates the pivotal connection 30 between the X-link 28 and the link plate 22 and a pivotal connection 38 between the X-link 28 and a tube 52. The tube 52 remains fixed relative to the frame 40, and the X-link 28 pivots about the pivotal connection 38. The X fink 28 is preferably an X-bar that provides some lateral stability to the walking beams 18. Although, an X-bar configuration is used, other known configurations are within the contemplation of this invention to increase lateral stability of the walking beams 18.

The torsion link 34 includes the pivotal connection 36 to the link plate 22 and a rigid connection 39 to a torque tube 54. The rigid connection 39 of the torsion link 34 to the torque tube 54 provides torsional stability to the walking beams 18. The rigid connection 39 between the torsion link 34 and the torque tube 54 provides a torsional load on the walking beams 18 that counters rolling movement of the vehicle 12.

In operation, vertical displacement of the walking beams 18 causes a corresponding rotation about the axis 60 of the link plate 22 (FIGS. 3B and 3C) due to the pivotal connection with the X link 28 and the torsion link 34. The rotation of the link plate 22 accommodates longitudinal displacement caused by the arc motion of the fixed length X link 28 and torsion link 34 to minimize longitudinal displacement of the walking beams 18. The load transmitted from the wheels 14 to the walking beam 18 is further transmitted through the air spring assemblies 20 to the frame 40. Each of the air spring assemblies 20 proportionally transfers loads such that no single air spring assembly 20 supports the entire load. That is, a portion of a load exerted by one axle 16 is distributed by way of the walking beam 18 through two air spring assemblies 20.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A vehicle suspension assembly for a vehicle having a frame and a first and second axle, said vehicle suspension assembly comprising:
   a first and a second walking beam disposed to be substantially parallel to a vehicle longitudinal axis, the first and second axles mountable to said first and second walking beams;
   a link plate pivotally attached to each of said first and second walking beams and pivotal about an axis transverse to the vehicle longitudinal axis; and
   a pair of links attachable between said link plate and the frame, wherein a first one of said pair of links includes a rigid connection mountable to the frame, and a second one of said pair of links includes a pivotal connection mountable to the frame.

2. The assembly as recited in claim 1, wherein each of said pair of links includes a pivotal attachment to said link plate, said pivotal attachments to said link plate disposed within a common vertical plane.

3. The assembly as recited in claim 1, wherein said rigid connection includes a torsion tube securable to the frame.

4. The assembly as recited in claim 1, comprising a pair of air spring assemblies mounted to each of said first and second walking beams.

5. The assembly as recited in claim 1, wherein each of the first and second axles is pivotally mountable to said first and second walking beams by a mount bracket.

6. The assembly as recited in claim 5, comprising a torque link attached between each of said first and second walking beams and said mount bracket.

7. A vehicle suspension assembly for a vehicle having a frame and a first and second axle, said vehicle suspension assembly comprising:
   a first and a second walking beam disposed to be substantially parallel to a vehicle longitudinal axis, the first and second axles mountable to said first and second walking beams;
   a link plate pivotally attached to each of said first and second walking beams and pivotal about an axis transverse to the vehicle longitudinal axis; and
   a pair of links attachable between said link plate and the frame, wherein one of said pair of links comprises an X-shaped rod, said X-shaped rod pivotally attachable to the frame.

8. A tandem axle suspension assembly for a vehicle having a frame, a first axle and a second axle, said tandem axle suspension assembly comprising;
   a first walking beam and a second walking beam disposed along a longitudinal axis, the first and second axles mounted to said first and second walking beams;
   a link plate pivotally attached to each of said first and second walking beams and pivotal about an axis transverse to said longitudinal axis;
   a first link including a first pivotal connection to said link plate and a second pivotal connection connectable to the frame; and
   a second link including a third pivotal connection to said link plate and a fixed connection to a torque tube, where said torque tube is mountable to the frame.

9. The assembly as recited in claim 8, wherein said torque tube exerts a biasing force on said second link.

10. The assembly as recited in claim 8, wherein the first axle and the second axle are pivotally mountable to said first and second walking beams by a mount bracket.

11. The assembly as recited in claim 10, comprising a tie rod pivotally attached between said mount bracket and each of said first and second walking beams.

12. The assembly as recited in claim 10, comprising a pair of air spring assemblies mounted to each of said first walking beam and said second walking beam.

13. The assembly as recited in claim 10, comprising a lateral rod attachable between said mount bracket and a fixed structure.

14. A tandem axle suspension assembly for a vehicle having a frame, a first axle and a second axle, said tandem axle suspension assembly comprising:
   a first walking beam and a second walking beam disposed along a longitudinal axis, the first and second axles mounted to said first and second walking beams;
   a link plate pivotally attached to each of said first and second walking beams and pivotal about an axis transverse to said longitudinal axis;
   a first link including a pivotal connection to said link plate; and
   a second link including a pivotal connection to said link plate, where each of said first and second links are connectable to the frame, and wherein said first link comprises an X-shaped rod.

15. A tandem axle suspension assembly for a vehicle having a frame, said tandem axle suspension assembly comprising:
   a first walking beam and a second walking beam disposed along a longitudinal axis;
   a first axle mount and a second axle mount pivotally attached to each of said first walking beam and said second walking beam;
   a first link plate pivotally attached to said first walking beam and a second link plate pivotally attached to said second walking beam;
   a first link including a pivotal connection to each of said first link plate and said second link plate and a pivotal connection to the frame; and
   a second link including a pivotal connection to each of said first link plate and said second link plate and a rigid connection to a torque tube and said torque tube is rigidly mountable to said frame.

16. The assembly as recited in claim 15, including a pair of air spring assemblies mounted to each of said first walking beam and said second walking beam.

17. The assembly as recited in claim 15, including a torque link pivotally attached between each of said first axle mount and said second axle mount and a corresponding one of said first walking beam and said second walking beam.

18. The assembly as recited in claim 15, including a first lateral rod pivotally attached to one of said first axle mounts on one end and the frame on a second end.

* * * * *

UNITED STATES PATENT AND TRADEMARK OFFICE
CERTIFICATE OF CORRECTION

PATENT NO. : 7,229,094 B2 Page 1 of 1
APPLICATION NO. : 10/853426
DATED : June 12, 2007
INVENTOR(S) : Miller et al.

It is certified that error appears in the above-identified patent and that said Letters Patent is hereby corrected as shown below:

ON THE TITLE PAGE: item (75);

The 9th inventor should read as follows:

--Jos Timmermans, Ortonville, MI (US)--

Signed and Sealed this

Fourteenth Day of August, 2007

JON W. DUDAS
*Director of the United States Patent and Trademark Office*